(12) United States Patent
Koch

(10) Patent No.: US 12,366,383 B2
(45) Date of Patent: Jul. 22, 2025

(54) SOLAR EVAPORATOR FOR A PARABOLIC SOLAR COLLECTOR USING HEAT PUMP

(71) Applicant: Jean Koch, Brossard (CA)

(72) Inventor: Jean Koch, Brossard (CA)

( * ) Notice: Subject to any disclaimer, the term of this patent is extended or adjusted under 35 U.S.C. 154(b) by 474 days.

(21) Appl. No.: 17/694,307

(22) Filed: Mar. 31, 2022

(65) Prior Publication Data
US 2023/0314046 A1 Oct. 5, 2023

(51) Int. Cl.
F24S 23/74 (2018.01)
F24S 10/70 (2018.01)
F24S 20/20 (2018.01)
F24S 23/70 (2018.01)
F24S 23/71 (2018.01)
F24S 23/79 (2018.01)
F24S 40/55 (2018.01)

(52) U.S. Cl.
CPC ............ F24S 23/74 (2018.05); F24S 10/742 (2018.05); F24S 20/20 (2018.05); F24S 23/71 (2018.05); F24S 23/79 (2018.05); F24S 40/55 (2018.05); F24S 2023/833 (2018.05)

(58) Field of Classification Search
CPC .................................. F24S 23/74; F24S 40/55
USPC ................................ 126/690, 569, 587, 906
See application file for complete search history.

(56) References Cited

U.S. PATENT DOCUMENTS

| | | | |
|---|---|---|---|
| 3,875,926 A * | 4/1975 | Frank ...................... | F24S 10/95 122/366 |
| 3,927,659 A | 12/1975 | Blake et al. | |
| 4,100,763 A * | 7/1978 | Brody .................. | F24D 11/0285 62/412 |
| 4,335,578 A | 6/1982 | Osborn et al. | |
| 4,339,930 A * | 7/1982 | Kirts ....................... | F25B 29/00 126/609 |
| 4,340,030 A * | 7/1982 | Molivadas ............. | F24S 10/503 126/714 |
| 4,392,359 A * | 7/1983 | Franklin ............... | F24S 10/753 62/235.1 |
| 5,228,293 A | 7/1993 | Vitale | |
| 8,104,465 B2 * | 1/2012 | Kribus .................... | H02S 40/44 136/246 |
| 8,464,535 B2 | 6/2013 | White et al. | |
| 8,894,228 B2 * | 11/2014 | Arbesman ............ | G02B 17/002 126/684 |

(Continued)

FOREIGN PATENT DOCUMENTS

| | | |
|---|---|---|
| EP | 0593649 | 4/1998 |
| WO | WO2011047086 | 4/2011 |
| WO | WO2014134405 | 9/2014 |

Primary Examiner — Steven B McAllister

(57) ABSTRACT

The solar evaporator is comprised of a parabolic dish structure and the evaporator located just outside of the focal point. The refrigerant, coming from the heat pump, circulates through the evaporator. After having been heated up by the concentrated solar heat, the refrigerant is routed to the heat pump which compresses the refrigerant so as to extract the maximum amount of heat collected. The goal is to continuously maximize the temperature differential at the receiving coil by keeping the refrigerant at the lowest temperature possible in order to maximize heat gains at the evaporator. Multiple parabolic dishes can work together wherein they are connected in parallel to the header. A sun tracking mechanism ensures that the dishes are always pointing towards the sun. The extract heat can be used for multiple purposes.

6 Claims, 3 Drawing Sheets

(56) References Cited

U.S. PATENT DOCUMENTS

| | | | |
|---|---|---|---|
| 2009/0277440 A1* | 11/2009 | Angel | F24S 50/20 |
| | | | 126/684 |
| 2009/0277442 A1 | 11/2009 | Jensen | |
| 2011/0174359 A1* | 7/2011 | Goei | F24S 30/455 |
| | | | 136/246 |
| 2015/0184894 A1* | 7/2015 | Verma | F24S 50/20 |
| | | | 126/620 |
| 2016/0084545 A1* | 3/2016 | Hammond | F25B 27/005 |
| | | | 62/235.1 |

* cited by examiner

SOLAR EVAPORATOR FOR A PARABOLIC SOLAR COLLECTOR USING HEAT PUMP

CROSS-REFERENCE TO RELATED APPLICATIONS

N/A

BACKGROUND OF THE INVENTION

1. Field of the Invention

The present invention relates generally to solar heat collectors but more particularly to a solar evaporator located at the center of a parabolic solar collector using a heat pump with refrigerant.

2. Description of Related Art

When using solar concentrators, such as mirrors pointing to a central location where a heat collector is located, or using a reflective parabolic dish, the sun rays are focused at a focal point, which is a very small area but with very high temperature. At this focal point, a heat transfer liquid is circulated in order to retrieve the heat concentrated at that area. The liquid is then passed through a heat-exchanger to provide some use for that system. The drawback of such designs is that the return temperature of the heat exchanger is quite high, which reduces its capacity to absorb much of the heat from the collector, which is much higher than in the case of a refrigerant which decreases the absorption capacity and efficiency of the receiver at the focal center of the parabolic sensor by not maintaining a high temperature differential at the focal center receiver. Consequently, a solar evaporator for a parabolic solar collector using a heat pump is provided.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is a main object of the present disclosure to provide for a solar evaporator for a parabolic solar collector using a heat pump.

In order to do so a system is provided a reflective parabolic solar collector comprised of a multiple dish structure and a reflective frame structure; a solar evaporator comprised of a plurality of tubes; a heat pump having an inlet pipe and an outlet pipe, wherein the solar evaporator is connected to the inlet pipe and the outlet pipe; and, wherein a mode of operation, a refrigerant travels through the inlet pipe from the heat pump and circulates through the solar evaporator, which is configured to evaporate the refrigerant, wherein the evaporated refrigerant is then routed back to the heat pump via the outlet pipe, wherein the heat pump is configured to compress the evaporated refrigerant such that a maximum amount of heat collected is extracted, wherein the extracted collected heat travels to a condenser coil.

In one embodiment, the solar evaporator is located proximal to a focal point of the multiple dish structure. In one embodiment, the reflective frame structure is configured to hold the solar evaporator. In one embodiment, the condenser coil is configured to provide heat for use. In one embodiment, a temperature controlled valve positioned and installed proximate the solar evaporator on the outlet pipe is provided, wherein the temperature controlled valve is configured to control a temperature differential at the solar evaporator. In one embodiment, each dish structure of the multiple dish structure is connected in parallel. In one embodiment, the solar evaporator is positioned in a parallel along the inlet pipe. In one embodiment, the plurality of tubes are constructed of a high heat conductivity and absorption material. In one embodiment, the inlet pipe and the outlet pipe are constructed of a high heat conductivity and absorption material.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a solar evaporator for a parabolic solar collector using a heat pump.

It is to be understood that the terminology used herein is for the purpose of describing particular embodiments only and is not intended to be limiting. The terms "a" or "an," as used herein, are defined as to mean "at least one". The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, not necessarily mechanically, and not permanent. The term "providing" is defined herein in its broadest sense, e.g., bringing/coming into physical existence, making available, and/or supplying to someone or something, in whole or in multiple parts at once or over a period of time. As used herein, the terms "about", "generally", or "approximately" apply to all numeric values, whether or not explicitly indicated. These terms generally refer to a range of numbers that one of skill in the art would consider near the stated amount by about 0%, 5%, or 10%, including increments therein. In many instances these terms may include numbers that are rounded to the nearest significant figure.

Figure 1:
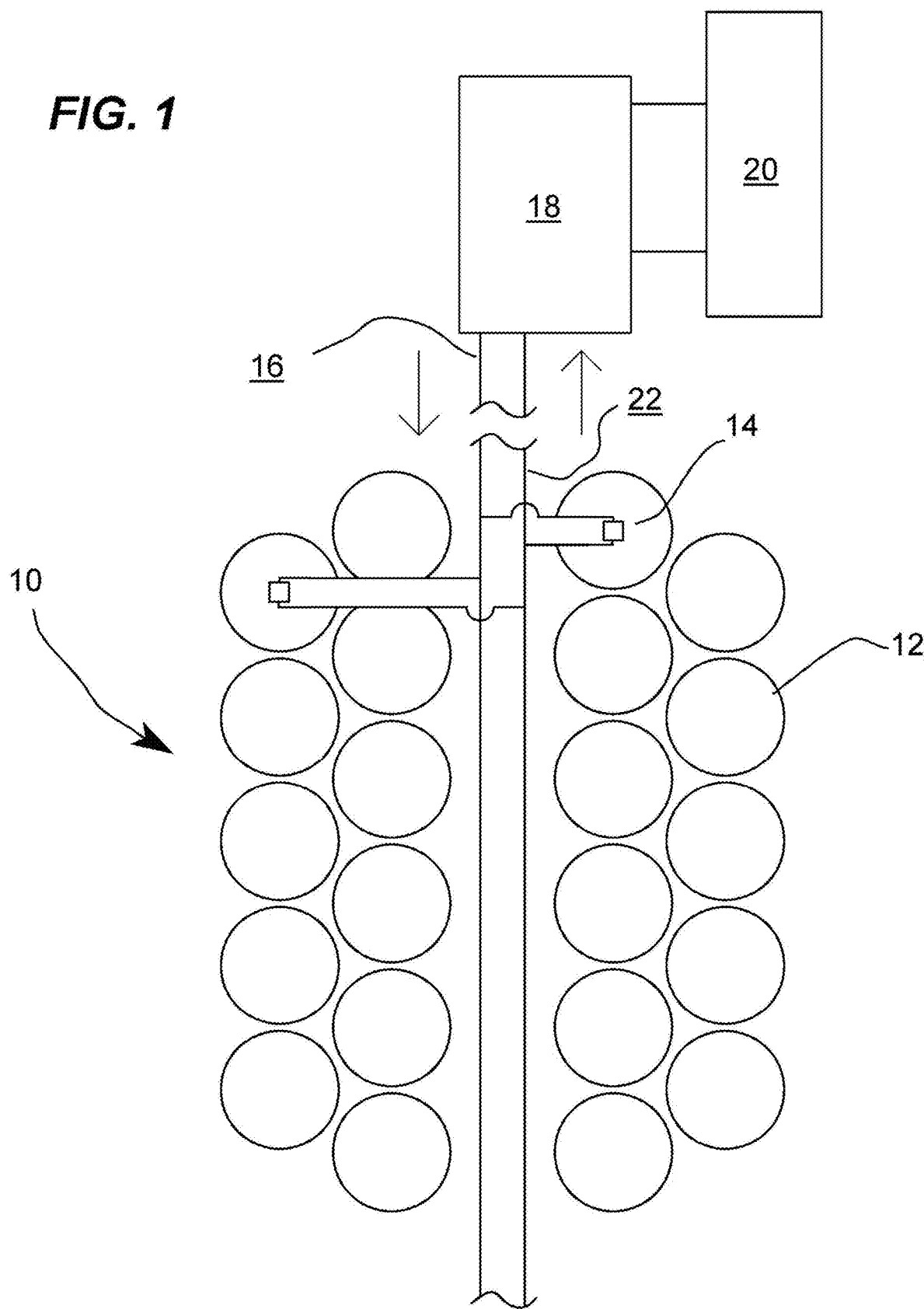
FIG. 1 is a schematic top view of an installation of a solar evaporator with a parabolic solar collector using a heat pump according to an embodiment of the present invention.
Figure 2A:
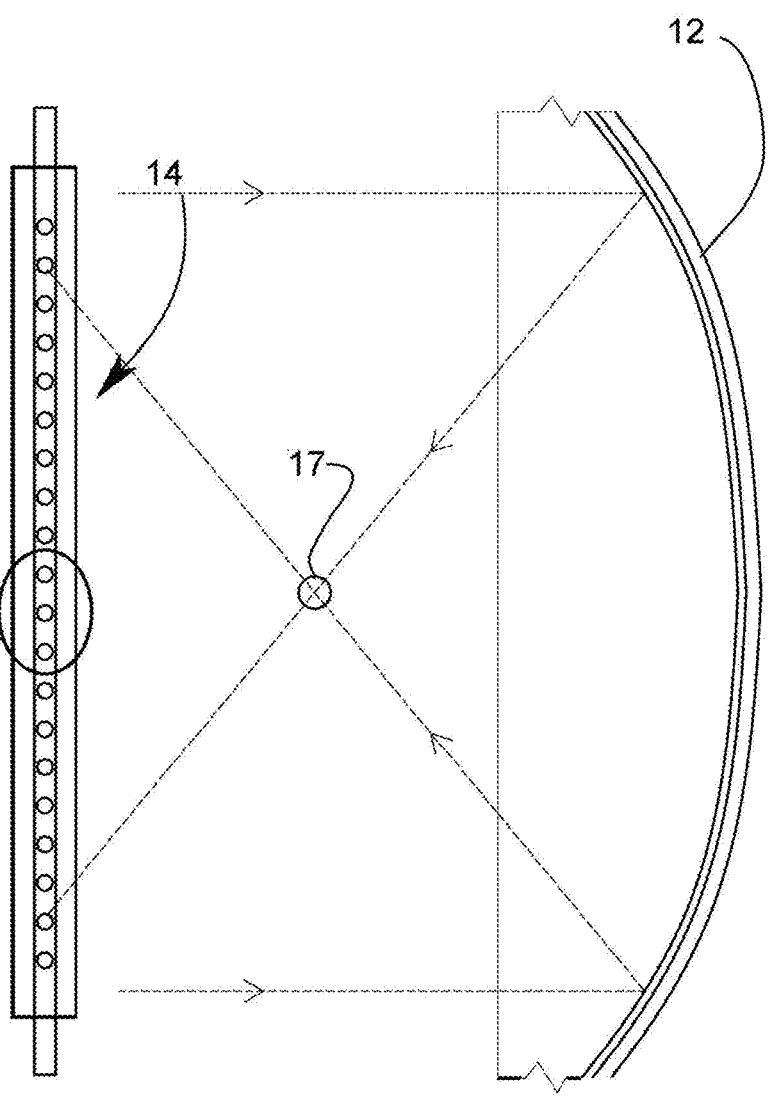
FIGS. 2A-B are a cutaway view and close up detail respectively, of the receiving evaporator and dish according an embodiment of the present invention.
Figure 2B:
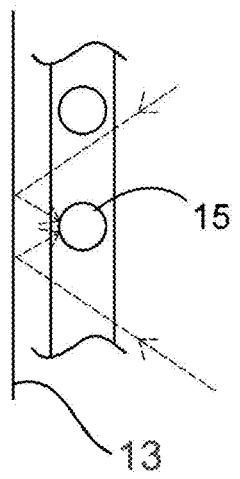
Figure 3A:
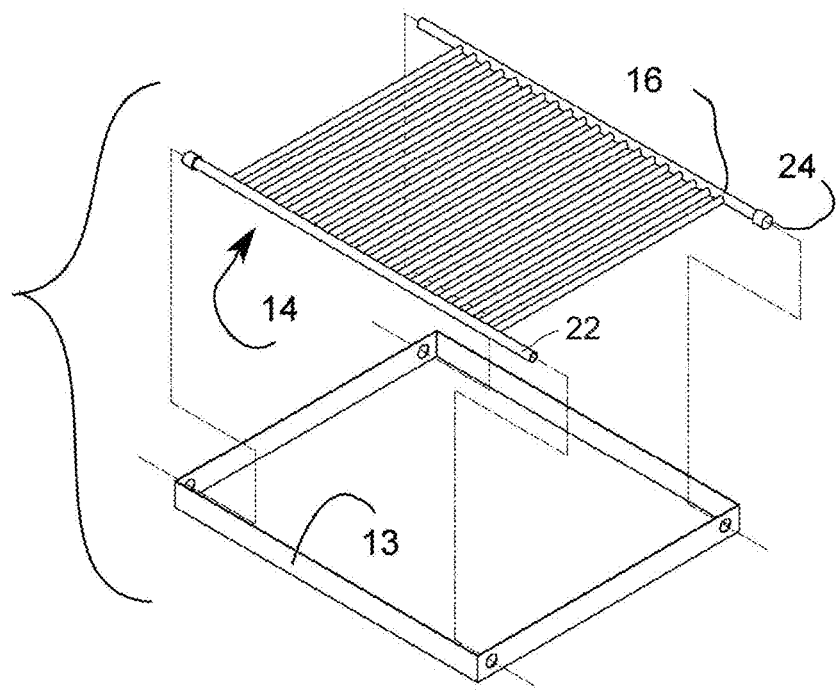
FIGS. 3A-B are exploded and isometric views respectively, of the evaporator and its frame structure according an embodiment of the present invention.
Figure 3B:
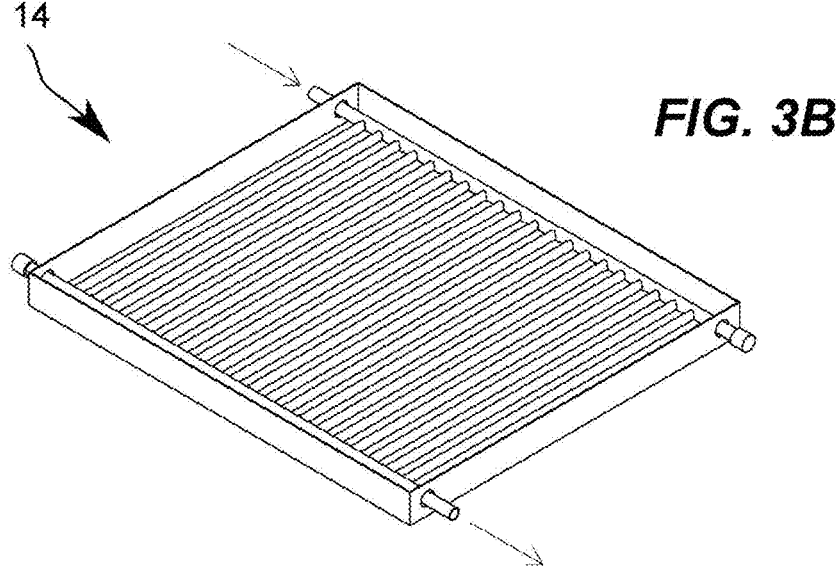

Referring now to any of the accompanying FIGS. 1-3, the system of the present invention comprises a parabolic solar collector 10 having a multiple dish structure 12 and a reflective frame structure 13, wherein the reflective frame structure 13 is configured to hold a solar evaporator 14. In one embodiment, the solar evaporator 14 is comprised of a plurality of tubes 15. In one embodiment, the solar evaporator 14 is located proximal to a focal point 17 of the dish structure 12 and is connected to an inlet pipe 16 and an output pipe 22 from a heat pump 18. The position of the solar evaporator will be discussed in greater details below.

During use, a refrigerant travels through the inlet pipe 16 from the heat pump 18 and circulates through the evaporator 14, which evaporates the refrigerant, which is then routed back to the heat pump 18 via the outlet pipe 22. Advantageously, this compresses the evaporated refrigerant such that the maximum amount of heat collected is extracted. Then, the extracted heat goes to a condenser coil 20, which is configured to provide heat for any purpose as well known in the art, including but not limited to heating living areas, heating water, such as a swimming pool, or to rotate a turbine to produce electricity.

In one embodiment, a temperature controlled valve 24 is positioned and installed near the solar evaporator 14 on the outlet pipe 22. This allows an ideal temperature differential to be maintained. In one embodiment, the temperature controlled valve 24 is regulated by a temperature sensor (not illustrated) which is configured to monitor the temperature as well known in the art.

In low sunlight situations, such as when there are clouds passing between the sun and the dish structure 12, the flow of refrigerant must be reduced in order to maintain a good temperature differential at the solar evaporator 14. The temperature sensor that is positioned on the outlet pipe 22 senses a lower temperature closes the temperature controlled valve 24 located on the inlet pipe 16 in order to maintain a good temperature differential at the solar evaporator 14.

Advantageously, multiple parabolic dish structures 12 are configured to work together wherein they are connected in parallel to the heat pump 18 (as illustrated). In some embodiments, a sun tracking mechanism (not shown) can be used to ensure that the dishes are always pointing towards the sun, as well known in the art.

Regarding the position of the solar evaporator 14, in one embodiment, the solar evaporator 14 is positioned in a parallel along the inlet pipe 16 (as illustrated in FIG. 1). Advantageously, the solar evaporator has spacing in between the plurality of tubes 15 which allows the sun rays to at least partially pass through. These rays passing through are reflected on a reflective plate 13 located behind the tubes 15, wherein the tubes are hit by the sun rays on the front, back and sides which increase the contact surface with the sun rays, reduce the energy loss, and increase the energy gain.

In one embodiment, the solar evaporator 14 is located slightly outside of the focal point area 17 in order to benefit from a wider surface of contact of the sun rays with the evaporator grill. This allows for the capture of more energy in the refrigerant circuit by increasing the available surface of heat exchange.

In one embodiment, the plurality of tubes 15 and inlet and outlet pipes 16 and 23 respectively, are constructed of high heat conductivity material and are coated with a special black paint having 99.9% absorbency.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A system comprising:
   at least one parabolic solar collector comprised of a multiple dish structure and a reflective frame structure;
   a solar evaporator comprised of a plurality of tubes, wherein the plurality of tubes are spaced apart and positioned in parallel;
   a heat pump having an inlet pipe and an outlet pipe, wherein the plurality of tubes are directly attached and connected to the inlet pipe and the outlet pipe, and the plurality of tubes are positioned perpendicular to both the inlet pipe and the outlet pipe;
   wherein the reflective frame structure is rectangular having a first end and a second end, the second end opposite the first end, and each of the first end and the second end having apertures configured to receive the inlet pipe and the outlet pipe respectively;
   wherein the solar evaporator is configured to be held within the reflective frame structure forming a total heating area;
   wherein the total heating area is positioned at a distance from a focal point of the multiple dish structure so that the total heating area of the solar evaporator and the reflective frame structure receives solar energy concentrated from the multiple dish structure; and, wherein a mode of operation, a refrigerant travels through the inlet pipe from the heat pump and circulates through the solar evaporator, which is configured to evaporate the 2 refrigerant, wherein the evaporated refrigerant is then routed back to the heat pump via the outlet pipe, wherein the heat pump is configured to compress the evaporated refrigerant such that an amount of heat collected is extracted, wherein the extracted collected heat travels to a condenser coil; and further comprising a temperature controlled valve positioned and installed proximate the solar evaporator on the outlet pipe, wherein the temperature controlled valve is configured to control a temperature differential at the solar evaporator.

2. The system of claim 1, wherein the condenser coil is configured to provide heat for use.

3. The system of claim 1, wherein each dish structure of the multiple dish structure is connected in parallel.

4. The system of claim 1, wherein the solar evaporator is positioned at a right angle to the inlet pipe.

5. The system of claim 1, wherein the plurality of tubes are constructed of a conductive material and coated with a black paint having 99.9% absorbency.

6. The system of claim 1, wherein the inlet pipe and the outlet pipe are constructed of a conductive material and coated with a black paint having 99.9% absorbency.

* * * * *